United States Patent [19]
Högenauer et al.

[11] Patent Number: 5,273,722
[45] Date of Patent: Dec. 28, 1993

[54] GAS GENERATOR

[75] Inventors: Ernst Högenauer, Lochham; Robert Schmucker, Ottobrunn, both of Fed. Rep. of Germany

[73] Assignee: Bayern-Chemie Airbags GmbH, Munich, Fed. Rep. of Germany

[21] Appl. No.: 963,857

[22] Filed: Oct. 20, 1992

[30] Foreign Application Priority Data

Oct. 25, 1991 [DE] Fed. Rep. of Germany ....... 4135299

[51] Int. Cl.$^5$ ............................................. B01J 7/00
[52] U.S. Cl. .................................... 422/164; 280/736; 280/741; 422/165; 422/305
[58] Field of Search ............. 422/305, 164, 165, 166; 280/736, 741; 102/530, 531

[56] References Cited

U.S. PATENT DOCUMENTS

| | | | |
|---|---|---|---|
| 4,131,299 | 12/1978 | Ono et al. | 280/736 |
| 4,943,086 | 7/1990 | Cunningham | 280/741 |
| 5,201,542 | 4/1992 | Thuen et al. | 280/736 |

FOREIGN PATENT DOCUMENTS

| | | | |
|---|---|---|---|
| 044425T | 9/1991 | European Pat. Off. | 280/736 |
| 2364268 | 6/1975 | Fed. Rep. of Germany. | |
| 2518460 | 10/1975 | Fed. Rep. of Germany. | |
| 2454473 | 6/1979 | Fed. Rep. of Germany. | |
| 3742383 | 6/1989 | Fed. Rep. of Germany | 280/736 |
| 3921472 | 11/1990 | Fed. Rep. of Germany | 280/736 |
| 3939021 | 11/1990 | Fed. Rep. of Germany | 280/736 |
| 0092448 | 4/1991 | Japan | 280/736 |
| 3-157241 | 7/1991 | Japan | 280/736 |

*Primary Examiner*—Robert J. Warden
*Assistant Examiner*—Laura E. Collins
*Attorney, Agent, or Firm*—McGlew and Tuttle

[57] ABSTRACT

Gas generator of lightweight construction, especially of an impact protection system for occupants of a vehicle, wherein a housing shell and a cover are made in one piece, formed of light metal such as aluminum, and have internally located screw-threaded parts which are screwed against each other, so that they are connected to one another tightly in a press fit positive lock manner and in a compression-proof manner, and also accommodate and hold between them the igniter, the propellant, and the filter. This leads to considerably reduced production costs for series production. Despite the weight reduction achieved, the gas generator is resistant to high temperatures, and the propellant gases discharged are sufficiently cool and muffled.

6 Claims, 1 Drawing Sheet

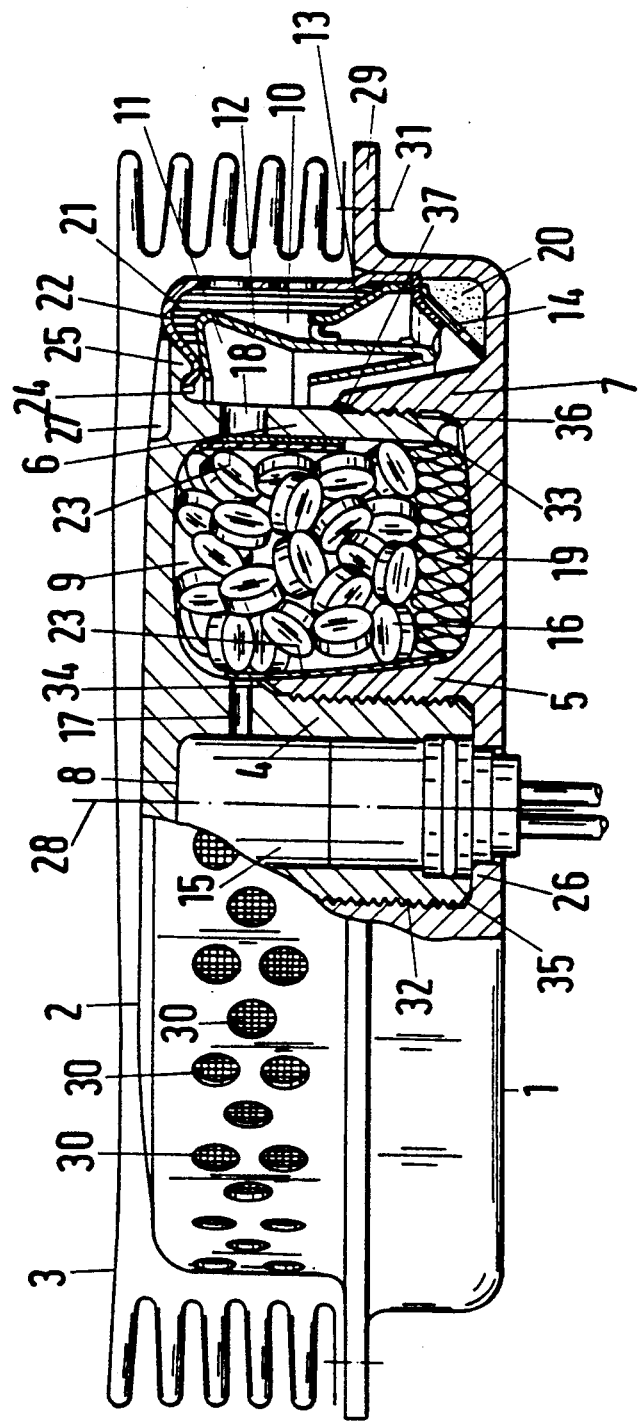

GAS GENERATOR

FIELD OF THE INVENTION

The present invention pertains to a gas generator of lightweight construction, especially of an impact protection system for occupants of a vehicle wherein the gas generator includes a central area with an igniter for an adjacent propellant chamber, which propellant chamber surrounds the igniter and is delimited in an outward direction by a filter chamber with outlet openings for propellant gas to be used downstream of the gas generator, the gas generator is formed by at least a housing shell made in one piece connected to a cover in a gas tight manner.

BACKGROUND OF THE INVENTION

Gas generators with a shell-like lower part and an upper part screwed to it and with an igniter, propellant chamber, and filter means arranged between these two principal parts were described and represented in the relatively early European Patent Applications 12,626 and 12,627.

This design has obviously not proven to be successful, because material-positive connections, especially those brought about by friction welding or electron beam welding, are preferred in more recent applications, such as EP 180,408 A1 and DE 29,15,202 A1, in order to connect a lower housing shell with the upper part.

In the prior-art screw connections, the thread is on the outside, which is disadvantageous.

The prior-art welded connections are tight and compression-proof, but they require a considerable expense for manufacture.

SUMMARY AND OBJECTS OF THE INVENTION

The object of the present invention is to improve a gas generator of the design mentioned above such that a substantially less expensive series production will become possible, on the one hand, but the ability of such a gas generator to function will not be impaired, on the other hand.

One of the most essential advantages of the present invention is that only two principal parts are to be installed according to the present invention. These are:

1. A lower shell with two screw-threaded parts located on the inside, and
2. a cover or an upper shell with two screw-threaded parts cooperating with the screw-threaded parts of the lower shell, wherein a non-positive and positive-locking connection is achieved on connecting the two principal parts by screwing them against each other, so that these two principal parts accommodate between them the igniter in the central area, and fix the propellant in an essentially annular area surrounding the central area, and a filter in an essentially annular area surrounding the central area, and a filter in an essentially annular area peripherally surrounding this annular area.

In addition, combined with this, a cyclone-like flow deflecting plate arrangement is inserted and fixed behind the propellant chamber in the direction of flow and in front of the filter, which covers the outlet openings to the user.

The various features of novelty which characterize the invention are pointed out with particularity in the claims annexed to and forming a part of this disclosure.

For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only FIGURE is a partially sectional view showing the gas generator formed of two principle parts.

DETAILED DESCRIPTION OF THE PREFERRED EMBODIMENT

As can be seen in the only FIGURE, the gas generator contains the following parts:

It has two principal parts 1 and 2 essentially in the form of shells, of which the lower shell contains the bottom of the gas generator and the upper shell forms or contains the cover. Viewed from the outside, e.g., in the top view, these are circular disks. On the inside, the lower shell and the upper shell form concentric circles by means of web-shaped parts 4 and 5 and/or 6 and 7. With this structure a chamber 8 for the igniter is formed in the central area, and a chamber 9 for accommodating the propellant, which chamber 9 also serves as a combustion chamber on ignition, is formed in the next annular area which surrounds the central area.

The principal parts 1 and 2 form, on the outside on the circumference, a filter chamber 10 between principal parts 1 and 2 and radially outward of web parts 6, 7. In front of the filter chamber 10, a deflecting plate arrangement is provided for generating a forced flow or guidance for the propellant gas for inflating the user. The deflecting plate arrangement as a whole is generally designated by reference numeral 11 and forms a cyclone flow. It contains individual plates 12, 13, and 14, which fit and cooperate with each other in order to fix these plates 12, 13, and 14 between the parts 1 and 2 after assembly in such a way that the desired forced flow, on the one hand, and the filter effect, on the other hand, will be ensured. After assembly, the gas bag 3 is fastened to a flange 29 and to the steering wheel by means of screws 31.

The igniter is designated by reference numeral 15, and the solid propellant, represented in the form of pellets here, is designated by reference numeral 16. The igniter 15 is of the known design and is connected toward the outside to an electric circuit which sends a triggering signal to it in the case of an impact/accident, so that it will then ignite the propellant 16 via passage openings 17, and the propellant will burn off in the combustion chamber 9 and release its propellant gas into the filter chamber 10 via the passage openings 18 and via the deflecting plate arrangement 11 before it is discharged to the user, e.g., a gas bag 3. Instead of a gas bag/air bag, it is also possible to inflate a belt tensioner or another protective system or a similar device. The passage openings 17 and 18 are advantageously covered by sealing and bursting films which permit passage only at a defined pressure. In the state of rest, the films serve for satisfactory sealing for years. The propellant 16 may be introduced into the combustion chamber 9 either as a loose bulk material, and volume equalization for the incomplete bulk filling with propellant can be brought about by means of, e.g., a wire mesh 19. The deflecting plates of the deflecting plate arrangement 11, namely, 12, 13, and 14, are preferably designed as thin steel plates, and they form, on the one hand, a cyclone flow, which brings about forced guiding of the propellant gas in the desired manner, so that not only is the flow deflected several times, but fine particles are also removed in the oblique component space shown in the lower right part of the drawing, which therefore represents a dirt particle collection chamber 20. The deflecting plate 13 adjoins the collection chamber and maintains the plate parts 12 and 14 at spaced locations from one another for a sufficiently expanded gas flow in and through the filter set 21. This is preferably also a prior-art metal wire bed, or knitted or woven metal wire, and it is held in its final position by a steel part 22, which is also designed as a thin plate part, which is supported on the lower shell 1, on the one hand, and extends at 24 behind a bead 25, which may extend around the cover 2, on the other hand. This design makes it possible to fix, and especially clamp in, in a gas-tight manner, as far as the igniter 15 and the propellant 16 are concerned, in the state of rest, all the other parts between the two principal parts 1 and 2 after these have been screwed together. The igniter 15 is pushed in from the top side in the representation, and is clamped by the cover onto a projection 26 during installation onto the part 1.

The principal parts 1 and 2 consist of light metal, preferably aluminum or an aluminum alloy, and are preferably made in one piece by injection molding. Injection molding is carried out under vacuum in a desired shape.

The webs of the lower shell 5 and 7 are designed such that they correspond to the webs 4 and 6 on the cover. They have threads facing each other for non-positive fixation, and the corresponding pointed end of the webs 5 and 7 as well as 4 and 6 is squeezed as a sealing lip into the material of the counterrings. Assembly is performed during screwing together after inserting the igniter, the propellant, as well as the deflecting plate arrangement and the filter set such that the lower shell and the upper shell are rotated against each other, or the lower shell is clamped in, and the upper shell or the cover is rotated on peripheral radial recesses 27 around the central axis 28 of both principal parts, which central axis also forms the axis of rotation for the screw threads 32, 33. As was explained above, the webs 4 through 7 are located on concentric circles around the central axis 28. Consequently, the force is introduced during assembly into the peripheral outer recesses 27 for screwing together, so that all parts will be clamped between the principal parts 1 and 2 in a tight and compression-proof manner. Consequently, this screw connection can be performed in a single operation. No further operations are required. The lower shell 1 also contains a the flange 29 for mounting the gas generator in, e.g., the steering wheel of a vehicle, if the gas generator is intended for the protection of a driver (air bag).

However, the present invention is not limited to this application.

The drawing of the exemplary embodiment shows above the flange, peripherally on the outside, that the steel plate part 22, which holds the filter set, is provided with a hole arrangement 30, wherein the holes 30 represent the outlet openings for the propellant gas, so that these will permit unhindered inflation of the user. The drawing also shows the corresponding screw threads, designated by reference numerals 32 and 33, and the pointed ends of the webs 4 through 7, which are pressed into each other, are arranged opposite each other especially in the manner of a sealing lip, and they are designated by the reference numerals 34 and 35 as well as 36 and 37. With such a press connection (wherein the sealing lip portions are dimensioned to press against the opposed sealing portions) the application of the necessary torque in making the connection of the two principal parts 1 and 2 results in a locking of the two principal parts and the sealing 34, 35, 36 and 37 as shown.

Modifications of the above-described exemplary embodiments are, of course, possible, and combinations of the characteristics described, represented, and claimed are also possible in particular. Modifications in terms of the type and the design of the igniter of the propellant and of the filter chamber with guiding means are also possible.

In particular, the igniting means, which comes into contact with the igniting pellet or another electric igniter, may be selected as desired. This also applies to the propellant and its packing (not only a loose bulk material). The filter mean may also be modified in various ways, even in combination with prior-art means, rather than being designed in the manner shown.

The deflecting device may also have a different form, but forced flow should be brought about such that the propellant gas will expand on its way to the filter and can remove particles, and the temperature and noise will also be reduced at the same time.

It is essential for the chambers between concentric parts be formed on the inside between the shells, such that they will hold tightly and firmly in a reliable manner for a long time. This is achieved by the non-positive connection/sole screw connection, with simultaneous mutual clamping or squeezing. Modifications in the shape and arrangement of the webs 4–7 are possible in this case as well.

While a specific embodiment of the invention has been shown and described in detail to illustrate the application of the principles of the invention, it will be understood that the invention may be embodied otherwise without departing from such principles.

What is claimed is:

1. A gas generator comprising:
a housing shell and a cover, said housing shell being formed of a single integral piece and said cover being formed of a single integral piece, each of said housing shell and said cover including opposing axially inwardly directed annular webs with engaging threaded portions, said threaded portions being provided dimensioned to achieve a frictional connection upon screwing said housing shell and said cover together, said threaded portions including pointed screw threaded parts for engaging a counterpart for a screwed press fit of said housing shell and said cover, said webs including a housing shell first web and a cover first web, said housing shell first web and cover first web being connected and cooperating to define a central area for receiving an igniter firmly held between said housing shell and said cover, said webs including a housing shell second web and a cover second web, said housing shell second web and said cover second web being connected and cooperating to define an adjacent propellant chamber surrounding said igniter, propellant being positioned in said propellant chamber firmly held between said housing shell and said cover, said propellant chamber being delimited in a radially outward direction by said housing shell second web and said cover second web, said housing shell and said cover each extending radially outwardly from said housing shell second web and said cover second web to define a filter chamber, filter elements being positioned in said filter chamber firmly held between said housing shell and said cover.

2. A gas generator according to claim 1, wherein:
said cover is provided with radially arranged recesses for application of force needed for screwing said threaded portions together.

3. A gas generator according to claim 1, wherein:
deflecting plates are positioned in said filter chamber for establishing forced flow.

4. A gas generator comprising:
a housing shell formed of a single integral piece of aluminum or aluminum alloy, said housing shell including a housing shell first annular web extending axially inwardly from a housing shell interior surface and a housing shell second annular web extending axially inwardly from said housing shell interior surface, said housing shell second annular web being spaced radially inwardly of a radially outer end of said housing shell;
a cover formed of a single integral piece of aluminum or aluminum alloy said cover including a cover first annular web extending axially inwardly from a cover interior surface and a cover second annular web extending axially inwardly from said cover interior surface, said cover second annular web being spaced radially inwardly of a radially outer end of said cover;
thread engagement means for connecting said housing shell and said cover, said housing shell first web and cover first web being connected and cooperating to define a central area for receiving an igniter firmly held between said housing shell and said cover, an adjacent propellant chamber being defined surrounding said housing shell first web and cover first web, propellant being positioned in said propellant chamber firmly held between said housing shell and said cover, said propellant chamber being delimited in a radially outward direction by said housing shell second web and said cover second web with outlet openings for propellant gas to flow therethrough, said housing shell extending radially outwardly from said housing shell second web to said radially outer end of said housing shell said cover extending radially outwardly from said cover second web to said radially outer end of said cover to define a filter chamber, filter elements being positioned in said filter chamber firmly held between said housing shell and said cover, said thread engagement means including engaging threaded portions provided on each of said housing first web, said housing second web, said cover first web and said cover second web, and including screw press fit means provided on said threaded portions for establishing a friction connection between webs of said housing shell and said cover after an application of defined amount of torque for screwing together said housing shell and said cover.

5. A gas generator according to claim 4, wherein:
said screw press fit means further comprises pointed screw threaded parts dimensioned larger than a counter part of each threaded portion for forming a sealing lip upon the application of torque for connecting said housing shell and said cover.

6. A gas generator comprising:
a housing shell formed of a single integral piece of aluminum or aluminum alloy, said housing shell including a housing shell first annular web extending axially inwardly from a housing shell interior surface and a housing shell second annular web extending axially inwardly from said housing shell interior surface, said housing shell second annular web being spaced radially inwardly of a radially outer end of said housing shell;
a cover formed of a single integral piece of aluminum or aluminum alloy said cover including a cover first annular web extending axially inwardly from a cover interior surface and a cover second annular web extending axially inwardly from said cover interior surface, said cover second annular web being spaced radially inwardly of a radially outer end of said cover;
thread engagement means for directly connecting said housing shell and said cover, said housing shell first web and cover first web being directly connected and cooperating to define a central area for receiving an igniter firmly held between said housing shell and said cover, an adjacent propellant chamber being defined surrounding said housing shell first web and cover first web, propellant being positioned in said propellant chamber firmly held between said housing shell and said cover, said propellant chamber being delimited in a radially outward direction by a direct connection between said housing shell second web and said cover second web with outlet openings for propellant gas to flow therethrough, said housing shell extending radially outwardly from said cover second web to said radially outer end of said housing shell said cover extending radially outwardly from said housing shell second web to said radially outer end of said cover to define a filter chamber, filter elements being positioned in said filter chamber firmly held between said housing shell and said cover, said thread engagement means including engaging threaded portions provided on each of said housing first web, said housing second web, said cover first web and said cover second web, and including screw press fit means provided on said threaded portions for establishing a friction connection between webs of said housing shell and said cover after an application of defined amount of torque for screwing together said housing shell and said cover.

* * * * *